United States Patent [19]

Beaulieu

[11] Patent Number: 5,048,995
[45] Date of Patent: Sep. 17, 1991

[54] COUPLER FOR TUBULAR FRAME MEMBERS

[75] Inventor: Bryan Beaulieu, Burnsville, Minn.

[73] Assignee: Skyline Displays, Inc., Burnsville, Minn.

[21] Appl. No.: 486,769

[22] Filed: Mar. 1, 1990

[51] Int. Cl.$^5$ .............................................. F16B 7/04
[52] U.S. Cl. ................................... 403/264; 403/174;
403/178; 403/245; 403/257; 403/297; 403/330;
403/409.1
[58] Field of Search ..................................... 403/17–18,
403/174, 178, 142, 217, 219, 245–247, 257,
253–258, 264, 297, 298, 330, 375, 182, 184, 189,
407.1, 409.1; 52/648, 633, 726; 279/2 R

[56] References Cited

U.S. PATENT DOCUMENTS

| | | | |
|---|---|---|---|
| 617,206 | 1/1899 | Tveit et al. | 403/142 X |
| 2,926,941 | 3/1960 | Thompson | 403/173 |
| 3,356,395 | 12/1967 | Dygert et al. | 403/112 |
| 3,362,738 | 1/1968 | Dygert et al. | 403/108 |
| 3,415,554 | 12/1968 | Papayoti | 403/187 |
| 3,443,348 | 5/1969 | Papayoti | 52/299 |
| 3,542,407 | 11/1970 | Brown | 403/174 X |
| 3,574,367 | 4/1971 | Jankowski | 403/297 X |
| 3,811,785 | 5/1974 | Hagglund | 403/297 X |
| 3,861,107 | 1/1975 | Papayoti | 403/178 X |
| 3,888,440 | 6/1975 | Rebentisch | 248/73 |
| 3,901,612 | 8/1975 | Canin | 403/264 X |
| 3,914,063 | 10/1975 | Papayoti | 403/406.1 |
| 3,927,499 | 12/1975 | Papayoti | 52/263 |
| 3,969,031 | 7/1976 | Kroopp | 403/178 X |
| 4,146,341 | 3/1979 | Smith | 403/174 |
| 4,270,872 | 6/1981 | Kiyosawa | 403/170 |
| 4,485,597 | 12/1984 | Worrallo | 403/297 X |
| 4,556,337 | 12/1985 | Marshall | 403/297 X |
| 4,934,858 | 6/1990 | Beaulieu | 403/297 X |

FOREIGN PATENT DOCUMENTS 18155  1/1974  Australia .

Primary Examiner—Peter M. Cuomo
Assistant Examiner—Franco S. De Liguori
Attorney, Agent, or Firm—Paul L. Sjoquist

[57] ABSTRACT

An improved coupler for use in assembling display frames is provided. The coupler includes a male plug, a female receptacle and a locking lever. After insertion into frame members, the plug and receptacle are engaged and locked in place. The coupler enables a frame which can be assembled and disassembled by hand and which provides a smooth, finished appearance having no outstanding protrusions.

14 Claims, 4 Drawing Sheets

COUPLER FOR TUBULAR FRAME MEMBERS

BACKGROUND OF THE INVENTION

The present invention relates generally to lightweight display structures or frames and, more particularly, to a connecting device or coupler for connecting together the structural members used to form a frame.

This invention is related to the invention described in my copending U.S application, Ser. No. 353,901, filed Feb. 21, 1989 now U.S. Pat. No. 4,934,858. Display frames, generally known as "space frames" are constructed using lightweight interchangeable modular framing elements and connectors. Such frames and connecting devices are known in the prior art.

One example of a frame and connecting device is disclosed in AU 4,444,424 (to Whisson), directed to a demountable frame including a joining means. The joining means comprises a first and second spigot means including locating surfaces which project into a first frame member and engage against the walls of a frame member and the opposite face of the other spigot. Similarly, U.S. Pat. No. 2,926,941 (to Thompson) is directed to another device for connecting frame members together. The Thompson device includes a connector formed of two mating half portions that have hollow projections; the projections have tapered surface areas and a shoulder at the end of the taper. U.S. Pat. Nos. 3,356,395, 3,362,738, and 3,888,440 disclose fastening devices which include features to positively lock the structural members into place or contact.

The prior art also includes a series of Unistrut Corporation patents (U.S. Pat. Nos. 3,270,478, 3,443,348, 3,914,063 and 3,927,499, among others). These patents are directed to or include disclosure of connecting fixtures for use with "space frame" structures.

The above-noted prior art does represent significant advances in the art of assembling modular, display or "space frame" structures. However, there are problems which have remained unaddressed.

The present invention provides a space frame having a smooth, finished looking surface with no protrusions or fastening devices extending from the surface or joints of the frame members while yet permitting a positive or active locking mechanism to insure that the frame, after being assembled, is stable and supportive of loads placed on it. A related advantage of the present invention is that it overcomes the problem that hardware traditionally associated with assembling display frames can interfere with display panels, shelves or the like which may be attached to the frame following its assembly.

The invention also provides a self-aligning connecting device which enables structural members to be correctly positioned prior to being locked into place, thereby facilitating proper alignment of the members comprising the frame structure; it also meets the need to provide a coupler or connecting device which will connect structural members so that the support structure frame may be assembled or disassembled without using any special tools or other tools such as screwdrivers, pliers or the like and the need to provide a coupler which does not require the use of conventional fasteners such as nuts, bolts, screws or pin/aperture connections.

SUMMARY OF THE INVENTION

In accordance with the present invention, a three part coupler or connecting device is provided for use in assembling display or space frames. The overall frame consists of vertical and horizontal members fastened together using the connecting device or coupler of the present invention. For purposes of this description, the terms "vertical" or "horizontal" or "lateral" member are merely illustrative of relative space positions of frame members; it should be apparent that frame members can be aligned in any orientation. The improved coupler comprises three parts: a first insert receptacle for insertion into the structural frame members which has four identical side faces, each face with a central recess between outstanding corner tabs; a second insert member or plug, one end of which complements and frictively inserts into frame members and a second end of which has two pair of resilient, flexible extensions for fitting cooperatively with the central recess of the first insertable receptacle; and, third, a two-ended locking or actuating lever having a graspable end and a projecting end. The lever has a crosspin or pivot pin and the projecting end is formed into a wedge or camming shape. The lever is housed by or inserted into the plug and may be pivoted about the crosspin so that the wedge or camming end positively locks together the plug and receptacle and the framing members into which they have been inserted.

An advantage of the present invention is that the coupler or connecting device disclosed herein may be used with tubular framing members to provide a smooth, finished looking surface with no protrusions, so that the coupler, structural members and the assembled framing structure as a whole will look continuous. Also, there will be no interference with display panels, shelves or the like which are to be attached to the frame after it is assembled.

Another advantage of the present invention is that the structural members making up the display frame may be positioned and aligned properly prior to being locked into place to insure proper alignment of the members comprising the frame structure.

Another advantage of the present invention is that the improved coupler for tubular frame members of the present invention enables the assembly and disassembly of frame structures without using any special tools or other tools such as screwdrivers, pliers or the like.

Other objects and advantages of the present invention will become more fully apparent and understood with reference to the following specification and to the appended drawings and claims.

DETAILED DESCRIPTION

Figure 1:
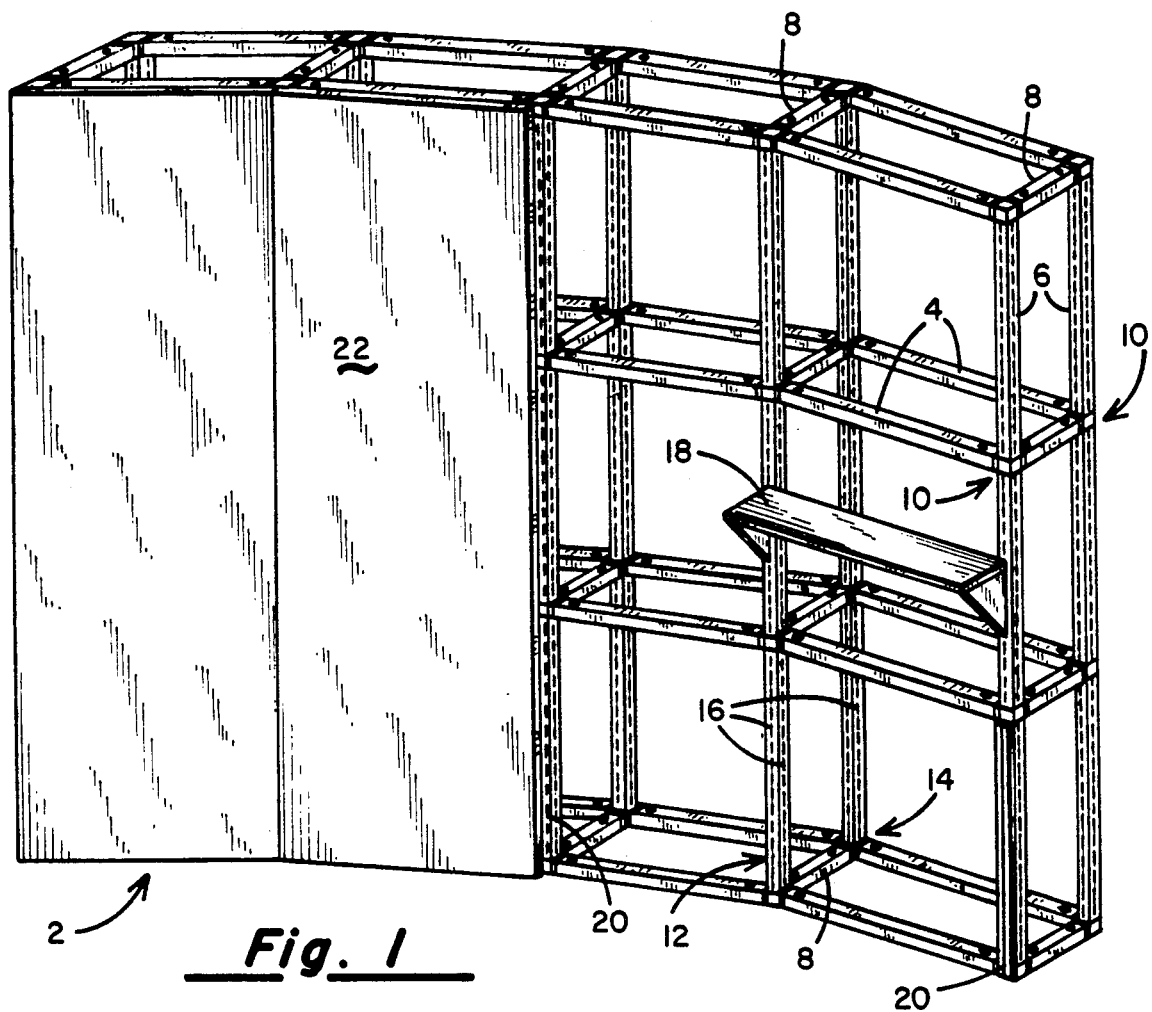
FIG. 1 is a perspective view of a display frame assembled using the coupler in accordance with the present invention.

Referring to the drawings, FIG. 1 shows a perspective view of a display unit 2 assembled in accordance with the present invention. The display unit 2 includes a plurality of horizontal framing members 4 fastened to a plurality of vertical members 6 and lateral members 8 by means of a plurality of connecting devices or couplers 10. The couplers 10 are the "universal" units from which many different structures may be assembled. In FIG. 1, a group of couplers 10 attach horizontal members 4 to vertical members 6 to form a first support frame section 12. The first support frame section 12 is then attached to or integrated with similarly constructed frame sections, such as frame section 14, by lateral members 8, to create a framework to be used as a display frame 2. It should be understood that not every horizontal, vertical or lateral member shown in FIG. 1 need be used nor do they need to be arranged in the specific arrangement depicted.

The vertical members 6 are provided with evenly spaced slots 16 aligned vertically along each face of the vertical members 6 to facilitate attachment of shelves 18 or the like to the display frame 2. The vertical members 12 may also have magnetic strips or hook and loop "Velcro" tape members 20 attached to the channels 16 to allow the placement of display panels 22. The display panels 22 would have complementary corresponding magnetic or "Velcro" surfaces to adhere to the tape members or magnetic strips 20 positioned on the display frame 2. The placement of display panels 22 on the display frame 2 creates a display unit which has the appearance of a custom designed display structure.

It is contemplated that the horizontal, vertical and lateral members, 4, 6, 8 respectively, be constructed of extruded aluminum tubing which may be produced as straight, angled or curved members depending on the desired configuration or size of the display frame 2. The ends of these support members may include 45° fillets (not shown) on the inside corners to facilitate the slidable insertion of the insertable parts (see FIGS. 4 and 5) of the coupler 10 of the present invention into the framing members. The couplers 10 of the present invention preferably may be constructed of die-cast metal to enable their manufacture to precise specifications so that a consistently proper fit is obtained within the tubular framing members.

Figure 3:
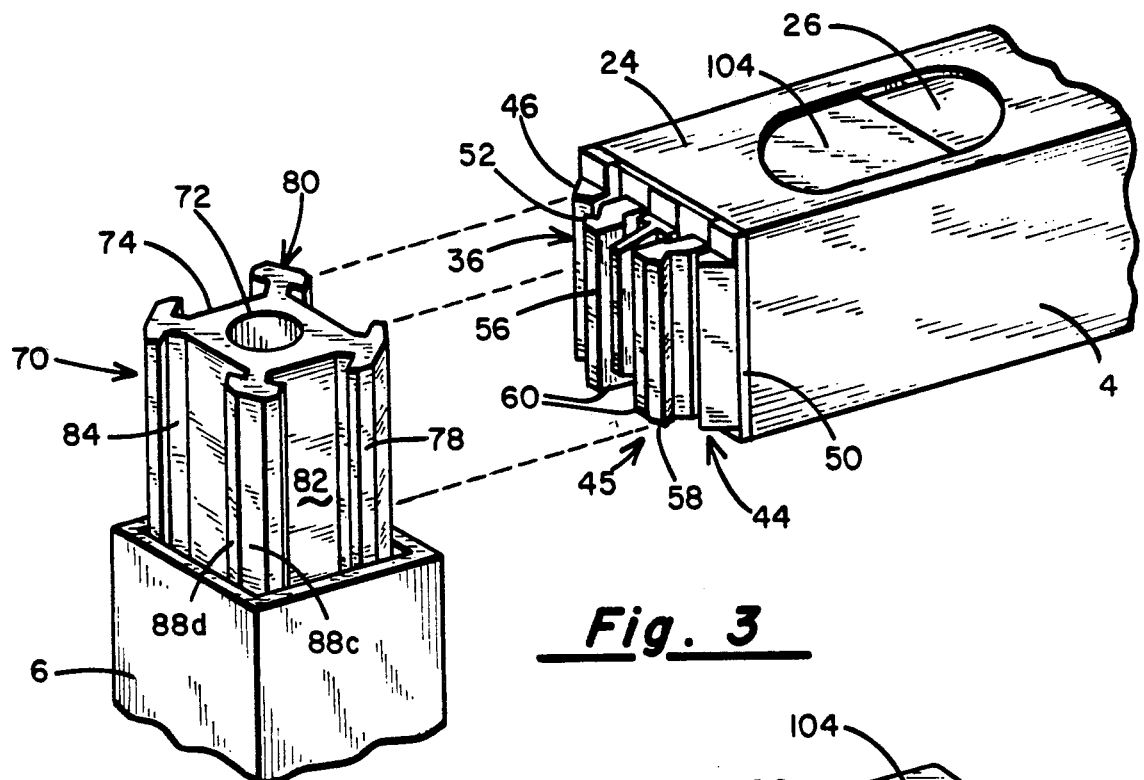
FIG. 3 is an exploded perspective view of a joint in the display frame using the coupler of the present invention, including phantom lines showing position in a completed joint.

The vertical members 12 may be of uniform construction, preferably formed of extruded aluminum or plastic tubing of square or rectangular cross section. Each of the four elongated faces of a vertical member 6 has a plurality of spaced slots or channels 16 adapted for holding shelves or the like. Any of the ends of the framing members 4, 6, 8 may be specially adapted to accommodate the insertion and actuation of the locking actuator (see FIG. 6) of the coupler of the present invention. For example, FIG. 3 shows an end portion 24 of a horizontal member 4 and particularly illustrates the cutout or access opening 26 designed to accept the locking actuator (see FIG. 6) of the present invention. The operation and installation of the coupler 10 of the present invention will be described more fully herein below. In a preferred embodiment, both ends of each horizontal member 4 and lateral member 8 may be similarly configured, with an access opening 26, wherein this construction enables a positively-locked, rigid and very stable display frame structure.

Figure 6:
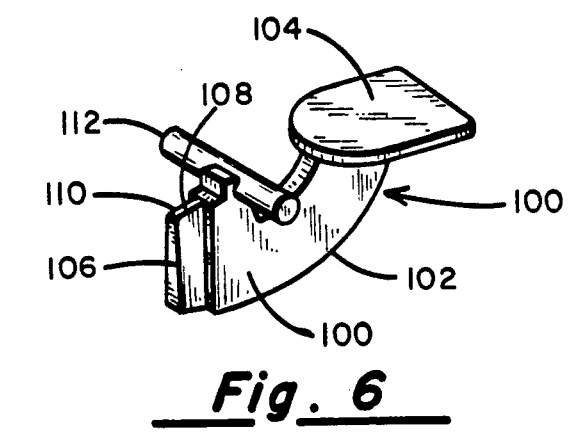
FIG. 6 is a perspective view of the locking or lock actuating lever of the coupler of the present invention.
Figure 5:
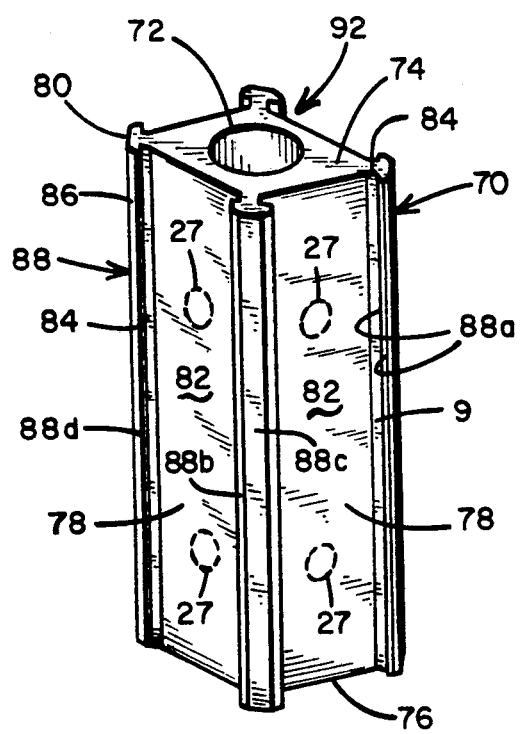
FIG. 5 is a perspective view of the receptacle of the coupler in accordance with the present invention.
Figure 4:
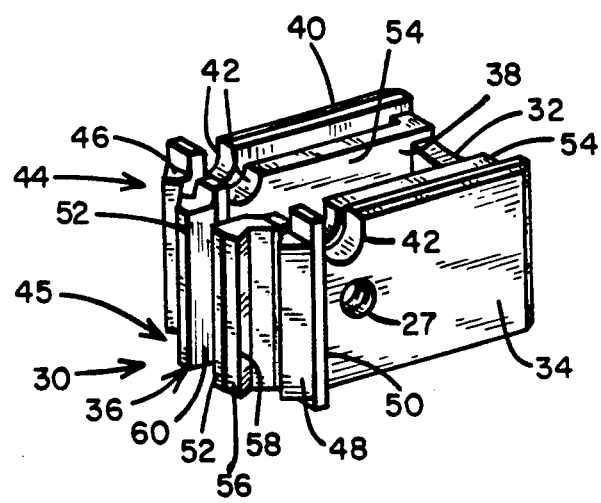
FIG. 4 is a perspective view of the plug of the coupler of the present invention.

FIGS. 4, 5 and 6 show a preferred embodiment of the coupler 10 of the present invention. The coupler 10 is formed of three basic parts: a male fitting plug and lever receiving housing 30 (see FIG. 4), a female receptacle 70 (see FIG. 5) and a locking actuator 100 (see FIG. 6). As shown in FIG. 4, the plug 30 has a back wall 32 for initial insertion into a framing member 24. Sidewalls 34 extend generally perpendicularly away from each edge of the back wall 32. A pair of resilient tabs 54 extend from back wall 32 interior of sidewalls 34 and in spaced-apart relation. Each tab 54 has a locking end 45 adapted for insertion between respective tabs 80 (see FIG. 3). The spaces between tabs 54 cooperatively form a lever-receiving cavity 38.

Near the spaced-apart ends 36 of the tabs 54, the upper surface 40 of the sidewalls 34 and tabs 54 has a crosspin receiving channel 42. The space between ends 36 of the plug opens into the lever-receiving cavity 38. The sidewalls 34 each have a projection 44 which is an extension of the sidewall 34. The projections 44 include corner projections 46, having a plurality of angularly related planar mating surfaces including mating flange 48 which can make contact with a like surface of another male plug, inserted into the receptacle 70 at an adjacent, right angle position, thereby forming a 90° inside corner when the coupler 10 of the present invention is used to assemble a space frame (see FIG. 2). Visible surface 50 is smoothly aligned flush with the outside surface of the frame members after the coupler 10 of the present invention is used to assemble the space frame (see FIG. 9).

The locking ends 45 of tabs 54 have enlarged central locking projections 52. The central locking projections 52 are at the end of tabs 54 extending from the back wall 32; tabs 54 are generally parallel to the sidewalls 34. The central locking projections 52 include a series of angularly related planar surfaces 56. Surfaces 56 form a rib 58 which cooperates with the female receptacle coupler member (see FIG. 9) to form a positive lock. This relationship will be explained more fully herein below and can be seen by looking at the cross-sectional figures, FIGS. 7, 8 and 9. The inner surfaces 60 of the locking projections 52 are planar, spaced parallel surfaces.

Figure 9:
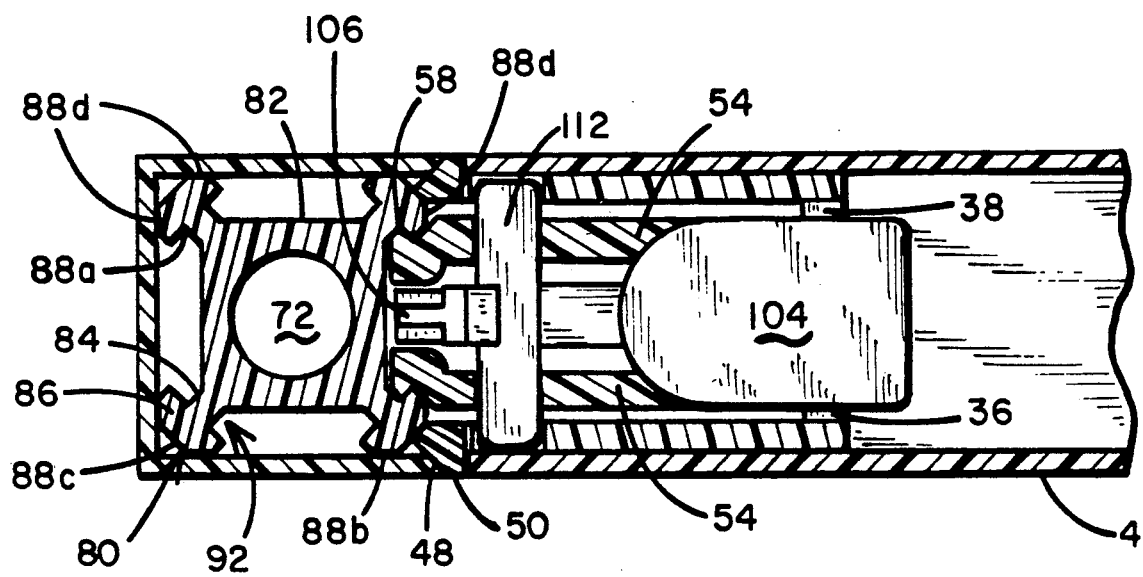
FIG. 9 is a top, partially cross-sectional view of an assembled and locked joint using the coupler of the present invention.

FIG. 5 depicts the second member or female receptacle 70 of the coupler or connecting device 10 of the present invention. The female receptacle has a core 72, upper surface 74, lower surface 76 and four identical side faces 78. The central core 72 is generally circular, and each corner of receptacle 70 has tabs 80 which extend diametrically away from the core 72. Between the tabs 80, each side 78 has an elongated central recess 82. With regard to the tabs 80, each tab has a post 84 and at the outermost end of the post 84, an expanded retaining head 86. The retaining head 86 is formed of a plurality of angularly related surfaces 88. Angular surfaces 88a define the outer boundaries of the central recess 82 and cooperatively interact with the central locking projections 52 of the plug 30, as will be explained herein below. Angular surfaces 88b abut the inner wall of the frame member 4, 6, 8 into which the receptacle 70 may be inserted. Angular surfaces 88c are frame member corner facing surfaces and cooperatively interact with mating flange 48 of the plug 30 as will be explained herein below. As shown in FIG. 9, the angularly related surfaces which define the central recess 82 form a rib 58 engaging trough 92. The interaction of the rib 58 and trough 92 forms the positive locking feature provided by the coupler of the present invention. This will be explained herein below.

FIG. 6 depicts the locking actuator 100 of the coupler 10 of the present invention. At one end of the lever shank 102, the actuator is provided with a graspable end 104. Opposite the graspable end 104 is the cam end 106. The cam end upper surface 108 may be chamfered at edges 110. Near cam end 106, the lever 100 is provided with a crosspin 112. The upper surfaces 108 of cam end 106 are tapered to form the top of end 106 narrower than its bottom, so that lever 100 expands the spacing of tabs 54 as lever 100 is pivoted about pin 112.

FIGS. 2, 3, 7 and 8 illustrate the orientation and operation of the coupler 10 for assembly of a display unit 2.

Assembly of the display unit 2 shown in FIG. 1 may be accomplished quickly, easily and without the need for tools or special connectors. In practice the following procedure might be followed. A lever 100 is placed shank 102 first into the lever-receiving cavity 38 of a plug 30 As the placement occurs, the crosspin 112 will naturally come to rest in the pin-receiving channel 42. The lever will be freely pivotal about the crosspin and within the lever-receiving cavity 38. Next, the lever 100 is positioned so that the graspable end 104 is parallel to the upper surface 40 of the sidewalls 34 of the plug 30. Beginning with the back wall 32 of the plug 30, the plug and the lever 100 positioned therein may be inserted into the end of, for example, a horizontal or lateral framing member 4, 8. The fitting 30 is inserted until the framing member walls make contact with the projections 44, thereby insuring that the plug will be inserted to the proper extent. The lever 100 is then pivoted to its raised position, thereby pivoting the cam end 106 from between the central locking projections 52 (see FIG. 7).

As shown in FIG. 4, the plug 30 may be provided with a screw aperture 27; together, screw 35 (FIG. 2) and aperture 27 cooperate to fix plug 30 in place; a similar system may be used to fix female receptacle 70 in place. Alternatively, an interference fit between plug 30 and the framing member may be constructed.

The female receptacle 70 is inserted into, for example, a vertical member 6. The plug 30, in a horizontal framing member 4, 8 with the graspable end 104 of the lever 100 raised, is aligned so that the central locking projections 52 are directed toward the central recess 82 of the receptacle 70 (see FIG. 3). Up to four of the plug fittings and the horizontal or lateral framing members 4, 8 into which they have been inserted may be joined into the four identical faces of the receptacle 70. As the plug is brought toward the receptacle, rib 58 will contact the angularly related surfaces 88 forming trough 92 and loosely snap into place. Likewise, rib 58 can be loosely unsnapped from trough 92 to remove the plug, if lever 100 is raised.

Figure 2:
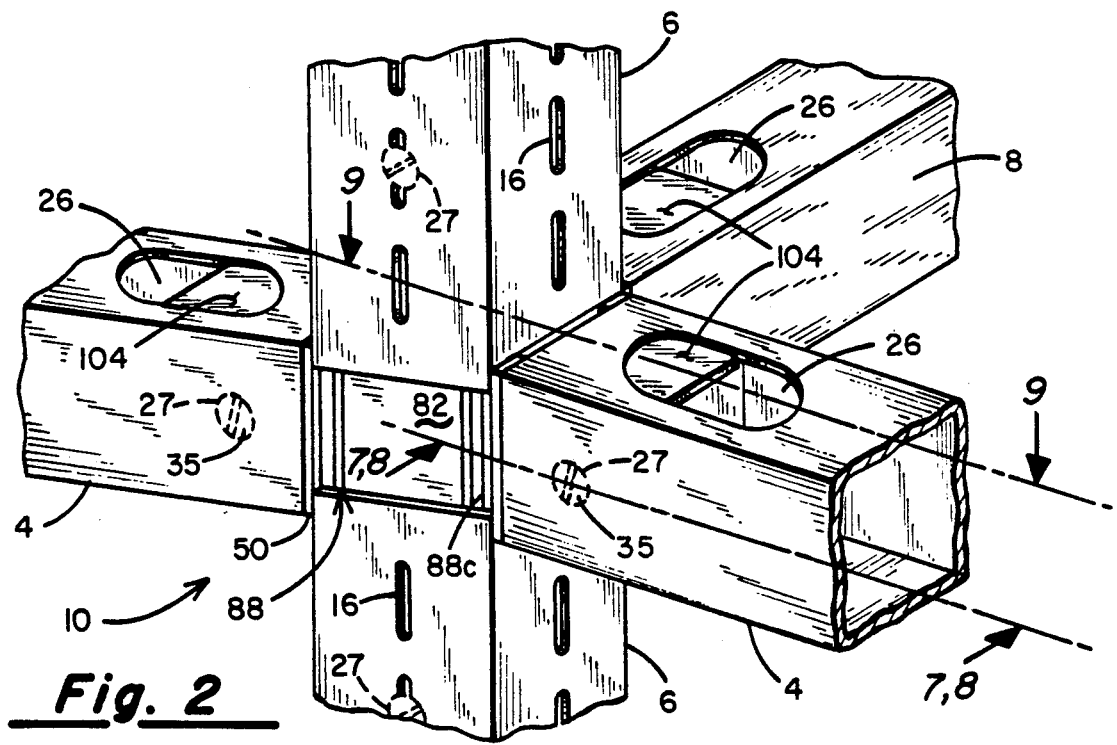
FIG. 2 is a close-up front perspective view of one of the completed joints in the display frame shown in FIG. 1.
Figure 7:
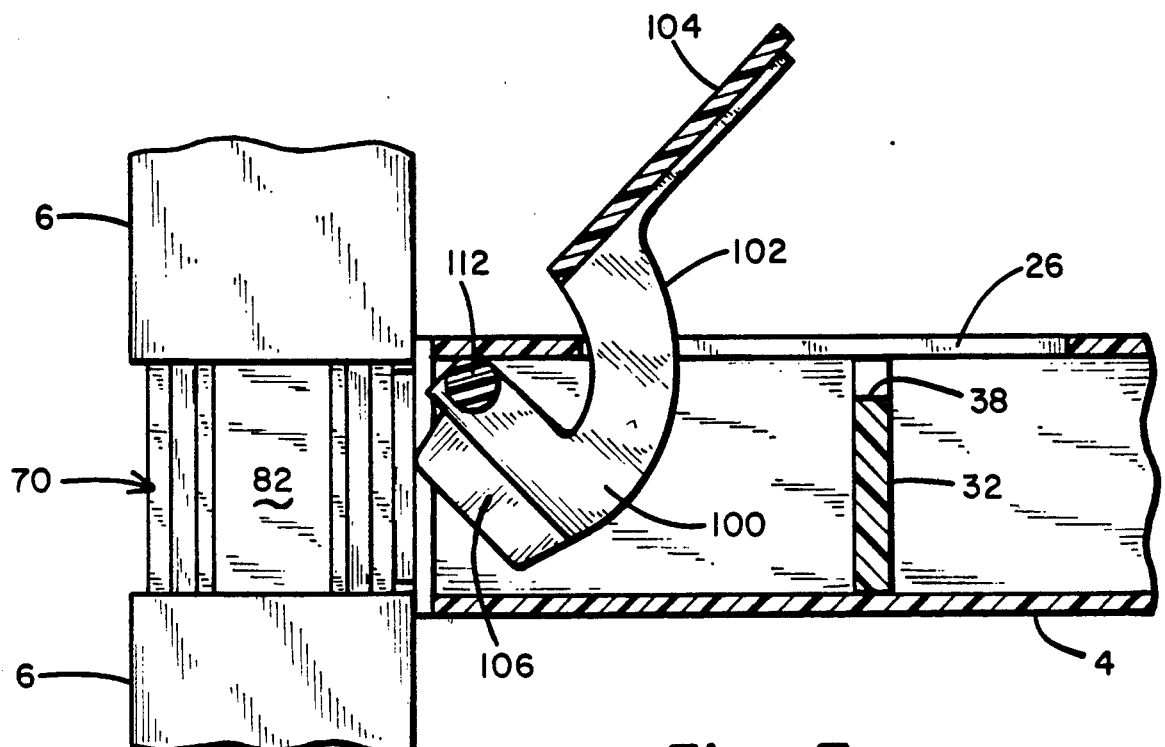
FIG. 7 is a cross-sectional view along line 7,8—7,8 in FIG. 2 of the open coupler of the present invention.
Figure 8:
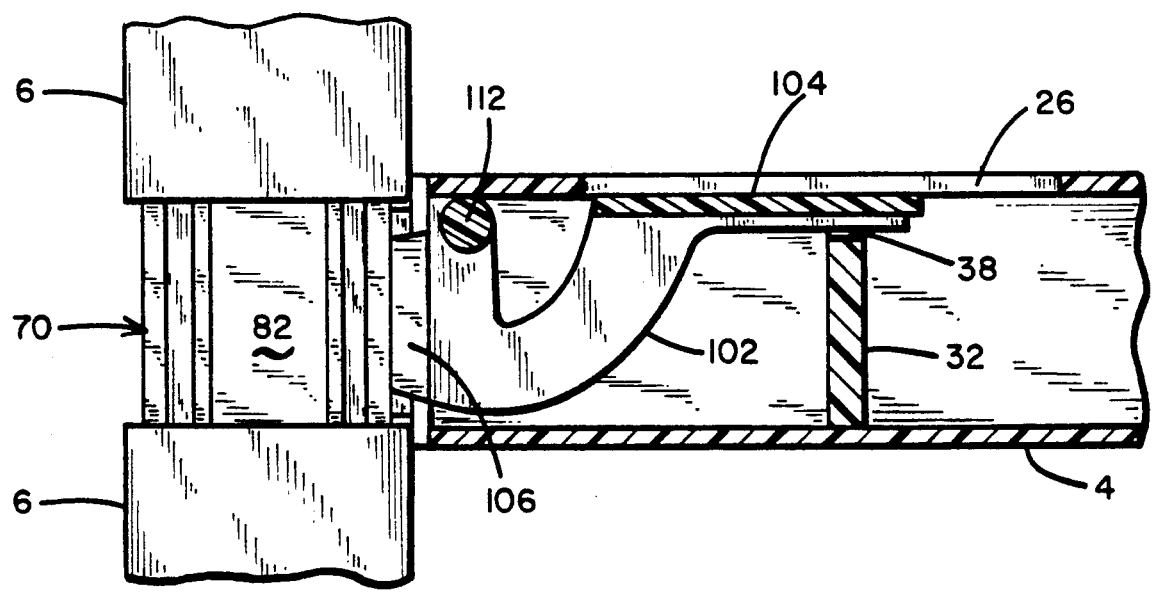
FIG. 8 is a cross-sectional view along line 7,8—7,8 in FIG. 2 of the closed coupler of the present invention forming a locked joint.
Figure 10:
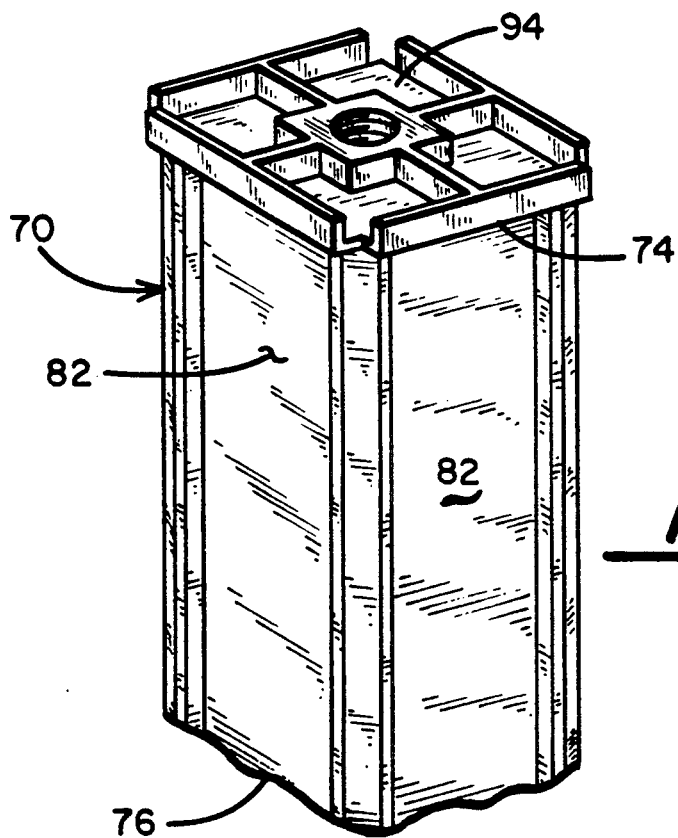
FIG. 10 is a perspective view of an alternative embodiment of the female portion of the coupler of the present invention.

At this point, as depicted in FIG. 7, an unlocked but partially completed joint has been formed and the alignment of the various framing members making up the display unit 2 may be checked prior to locking the joint in place. To provide the positive lock for the joint, locking lever 100 is pivoted about the crosspin 112 so that the graspable end 104 is brought toward access opening 26 until it lies parallel to the surface of the framing member into which the plug fitting 30 has been inserted (see FIG. 8). This motion causes the cam end 106 to be brought upwardly between the central locking projections 52 thereby forcing them apart and causing tight frictional contact between the rib 58 and trough 92 (see FIG. 9, with lever shown in sectional view). This camming action not only locks the plug 30 and receptacle 70 together, but also tends to force the retaining head 86 and the receptacle 70 into tight frictive contract with the wall of the framing member into which the receptacle has been inserted. FIG. 2 shows a perspective view of a joint after assembly and it can be noted that the coupler 10 of the present invention provides a smooth finished looking display surface which has no outstanding projections or protuberances. Once the display frame 2 has been assembled, display panels 22 or shelves 18 may by attached to the vertical members 6. As shown in FIG. 10 one end of the receptacle 70 may be equipped with adaptor 94. This adaptor enables a tabletop-type display having a planar flat upper or lower surface. Also the adaptor may be used to form a "foot" for vertical members 6 and/or the adaptor may be used to secure post-type lighting.

The present invention may be embodied in other specific forms without departing from the spirit or essential attributes thereof. The display unit 2 can be reconfigured into an infinite variety of display assemblies: vertical, horizontal and lateral members may be curved, angled or formed into unequal lengths to construct practically any frame assembly; finish plugs may be provided for use with the side faces 78 of the receptacle 70 to which no horizontal or lateral member is attached; the receptacle 70 may be shaped as any polygon having a selected number of side faces, as long as sufficient strength and stability is obtained; and, wall and beam structures may be formed using the teachings of the present invention.

Therefore, it is desired that the present embodiment described herein be considered in all respects as illustrative and not restrictive, reference being made to the appended claims rather than to the foregoing description to indicate the scope of the invention.

I claim:

1. An improved tripartite coupler for attaching together the tubular structural members of a structural support or display frame, said coupler comprising:

a) a receptacle having upper and lower opposed exterior end surfaces and a plurality of identical exterior side faces extending therebetween; each of said side faces including a central recess between two retaining heads;

b) a plug having sidewalls and two ends, a first end of said plug being adapted for frictional insertion into one of said structural members and a second end of said plug opposed to said first end having a plurality of projections adapted to engage said retaining heads of said receptacles; a pair of spaced apart tabs extending between said side walls and cantilevered from said first end, each tab having a locking end which is projectable into said central recess; and c) a lock actuator comprising a lever having a graspable end and an opposed tapered projecting end positioned between said tabs, said lever having a shank extending between said ends and having a crosspin attached to said shank; said crosspin extending between said sidewalls; whereby said lock actuator may be pivoted about said crosspin to separate said tabs and to engage said locking ends with said retaining heads or to disengage said locking ends from said retaining heads.

2. The coupler of claim 1, wherein said receptacle is adapted for partial insertion into said tubular structural members.

3. The coupler of claim 2, wherein said receptacle further comprises on elongated polygon having a central core, two opposed, generally planar exterior end surfaces and four identical exterior side faces extending therebetween, each said side face having an elongated, flat central recess and outwardly extending corner tabs.

4. The coupler of claim 3, wherein said corner tabs extend diametrically outwardly from said central core and further comprise a post having one end attached to said central core and having a second distal end, said distal end having an expanded retaining head attached thereto, said retaining head having a plurality of angularly related surfaces, the edges formed between said surfaces being parallel to the planes of said side faces.

5. The coupler of claim 4, wherein at least one of said angularly-related surfaces of the retaining head abuts the inside surface of the wall of a tubular structural member.

6. The coupler of claim 5, wherein said second end of said plug has two pairs of resilient, flexible projections extending away from said first end, said projections comprising one pair of corner projections extending from said sidewalls and one pair of central locking projections, said corner projections and said locking projections having enlarged free ends further comprising a plurality of angularly related, flat surfaces.

7. The coupler of claim 6, wherein said angularly related surfaces of said central locking projections form a rib for interlocking engagement with said faces of said receptacle.

8. The coupler of claim 1, wherein said first end of said plug is adapted for insertion into said tubular structural members and said second end is adapted for cooperative, interlocking engagement with said faces of said receptacle.

9. The coupler of claim 6, wherein said first end of the plug coupler comprises a back wall and said second end comprises a plurality of flexible projections, said plug having sidewalls extending between said back wall and said flexible projections, said back wall, flexible projections and sidewalls defining a central cavity.

10. The coupler of claim 9, wherein said cavity houses said lock actuator therein.

11. The coupler of claim 1, wherein said lock actuator projecting end comprises a cam means for spreading said flexible projections into complementary interlocking engagement with said side faces of said receptacles.

12. An improved tripartite coupler for attaching together the tubular structural members of a structural support or display frame, said coupler comprising:
a) a lock lever having two ends, a shank extending therebetween and a crosspin between the two ends, said crosspin extending laterally across the longitudinal axis of said shank so that the lever may be pivoted around the crosspin; one of said ends having a lateral wedge-shaped cross-section and the other of said ends comprising a graspable surface;
b) a plug having a pair of sidewalls, a pair of spaced apart tabs, a first end for insertion into one of said structural members and a second end having a pair of flexible projections, said plug having a housing between said ends for receiving said lock lever therein; said sidewalls and said tabs having upper surfaces defining channel portions receiving said crosspin; said wedge-shaped cross-section being movable between said pair of flexible projections; and
c) a receptacle having four identical side faces, each of said side faces having an elongated central recess with outstanding corner tabs, said tabs having a plurality of angularly-related surfaces for engagement with said plug flexible projections and said structural members.

13. The coupler of claim 12, wherein said plug and said receptacle are adapted for cooperative snap-fit engagement wherein said flexible projections of the plug interlock with said corner tabs of the receptacle and further wherein said lock lever is pivotally received in said plug so that one end of the lever may be pivotally moved into place between said flexible projections, spreading said projections into a positively-biased, locked snap-fit with the receptacle.

14. A coupler for providing a detachable link for interconnecting tubular members in mutually perpendicular positions, comprising:
a) a receptacle having at least a first end adapted for interference fit into a first tubular member, and having a portion projecting from said first tubular member, said portion comprising four corner projections and intermediate recesses, said corner projections each having retaining heads which extend partially over a respective intermediate recess in spaced relation thereto;
b) a plug having a first end adapted for interference fit into a second tubular member, and having a second end projecting from said second tubular member, said second end comprising a pair of sidewall projections respectively engageable against said corner projections; a pair of spaced apart tabs attached to said first end and extending between said sidewall projections to said second end, each of said tabs having a projecting locking end which is positionable into said intermediate recess between said retaining heads, said sidewalls and said tabs including upper surfaces defining channel portions;
c) a lock actuator comprising a lever pivotally mounted between said sidewall projections and said tabs, said lever having a wedge-shaped forward end between said tabs said lever comprising a crosspin resting in said channel portions; whereby pivotal movement of said lever causes said tabs to move apart, thereby engaging said projecting locking ends against said receptacle retaining heads.

* * * * *